United States Patent [19]
Shannon

[11] Patent Number: 5,723,789
[45] Date of Patent: Mar. 3, 1998

[54] IMPACT RESPONSIVE SENSOR

[76] Inventor: E. Paul Shannon, Rt. 2, Box 249, Killen, Ala. 35645

[21] Appl. No.: 180,288

[22] Filed: Jan. 12, 1994

[51] Int. Cl.$^6$ ..................................................... G01P 15/11
[52] U.S. Cl. ........................................ 73/514.31; 280/735
[58] Field of Search .......................... 73/516 R, 517 R; 280/735; 336/30; 200/61.45 M, 61.53; 335/205

[56] References Cited

U.S. PATENT DOCUMENTS

| | | | |
|---|---|---|---|
| 2,852,243 | 9/1958 | Shepard, Sr. | 73/517 R |
| 3,100,292 | 8/1963 | Warner, Jr. | 73/517 R |
| 3,129,347 | 4/1964 | Tognola | 73/517 R |
| 3,580,176 | 5/1971 | Boswell | 73/514 |
| 4,737,774 | 4/1988 | Chapman | 73/517 R |
| 4,754,644 | 7/1988 | Valenti | 73/517 R |

Primary Examiner—Christine K. Oda
Attorney, Agent, or Firm—John C. Garvin, Jr.; Harold W. Hilton

[57] ABSTRACT

An impact sensor comprising a non-ferrous housing having a passage therein and an end member provided at each end of the housing for enclosing the passage at opposite end thereof. At least one pair of magnetic members is mounted in spaced relation in the passage with the first of the at least one pair of magnetic members being rigidly secured in the housing. The second of the at least one pair of magnetic members is slidably positioned in the passage. Each member of the at least one pair of magnetic members has opposite magnetic poles and are positioned in the passage with a pair of poles of like polarity facing each other and with only the repelling magnetic force between the poles of like polarity serving to maintain the spaced relation between the magnetic members of the at least one pair of magnetic members. An inductance coil is circumferentially mounted about the housing. The inductance coil is positioned intermediate the magnetic members of the at least one pair of magnetic members and so disposed relative to the path of the slidable magnet so that a voltage is induced in said coil by movement of the magnet on its path responsive to an impact force acting on the housing. Conducting elements extend from the coil to transmit voltage from the coil.

1 Claim, 2 Drawing Sheets

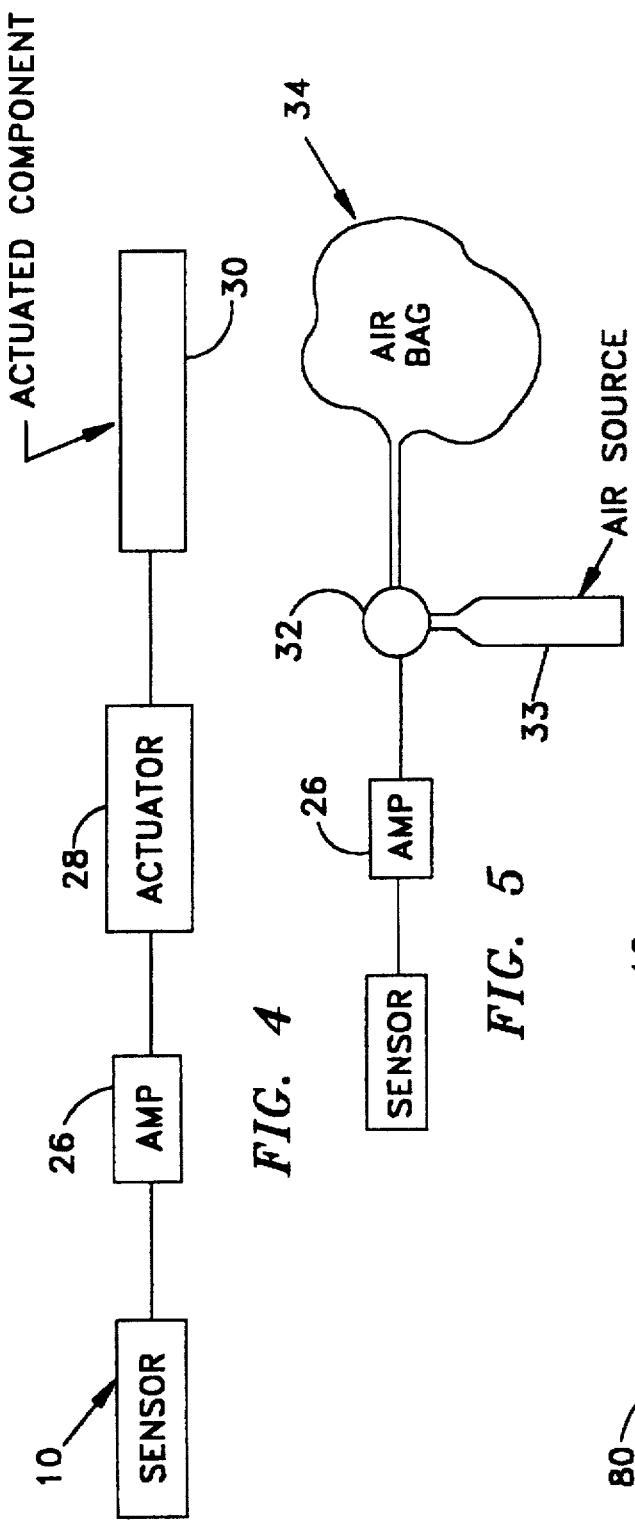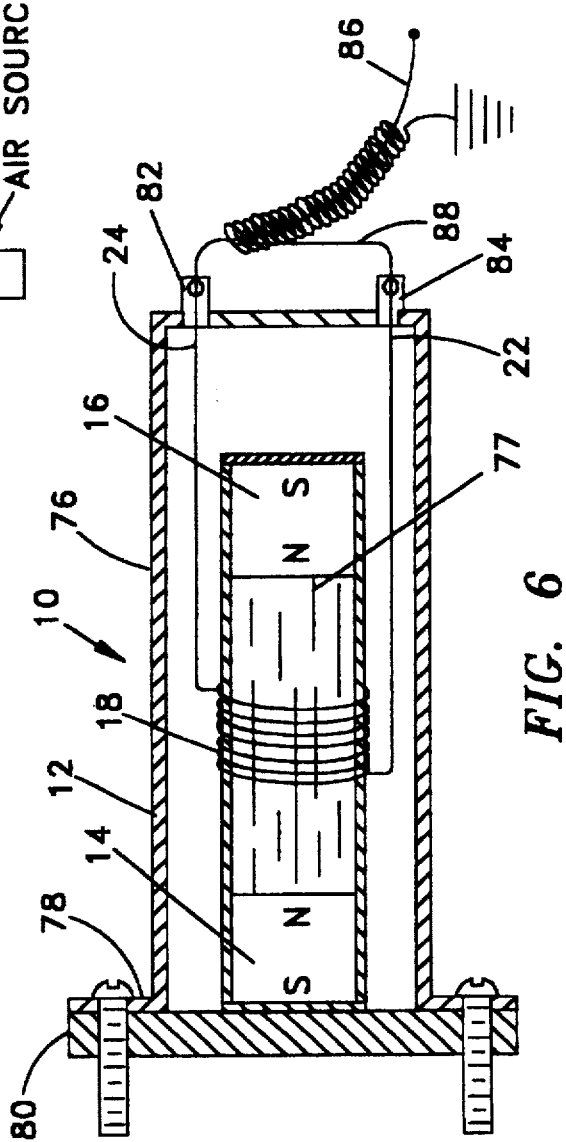

IMPACT RESPONSIVE SENSOR

FIELD OF THE INVENTION

This invention is generally directed to impact sensors and more particularly to an impact sensor which does not require an electrical power source but which generates an electrical signal responsive to an impact force. Such generated electrical signal being capable of activating other systems, such as an inflatable air bag of an automobile.

BACKGROUND OF THE INVENTION

The prior art teaches impact sensors which are actuated to produce an output signal responsive to an impact force acting thereon. Typically, the output signal is used to trigger actuating mechanisms for inflating the air bags carried in modern vehicles.

One of the prior art patents relating to such a sensor is U.S. Pat. No. 4,177,370 issued Jan. 5, 1993 to Jack B. Meister and entitled "Impact Sensor For Vehicle Safety Restrain System". The apparatus of this patent employs two permanent magnets, both of which are slidably mounted in a passage provided in a cylindrical housing and which are held apart by the repelling forces of the magnets which are mounted in the passage of the housing with like magnetic poles facing each other. In one embodiment, a Weigand wire is positioned externally of the passage in a recess in the surface of the body and uses an external magnetic field of appropriate polarity for switching between two stable magnetic flux generating states. An electrical coil positioned adjacent the Weigand wire provides an output signal as a result of acceleration forces on the magnets. In another embodiments a Hall effect sensor is mounted in a recess provided in the housing. The Hall effect sensor provides an output signal to an electronic interface.

One drawback of the Meister patent (U.S. Pat. No. 4,177,370) is that he uses a magnet supporting housing of permeable material which prevents the magnetic force on the magnets from changing with a change in position of the magnets. Such structure would make a winding around the cylinder useless. Additionally, both magnets used in the Meister device are slidable in the housing. Such structure would make it very difficult, if not impossible, to calibrate the sensor by providing a predetermined spacing between the magnets to provide a predetermined repelling force between the magnets.

Furthermore, the sensor of the Meister patent is, in all cases, either on or off at a predetermined impact force and equipment (such as an automobile air bag system) using such a sensor cannot be tailored to respond to different levels of impact. Each bumper system is designed to absorb a certain amount of shock and they are not necessarily identical.

The Meister sensor as disclosed in U.S. Pat. No. 4,177,370 uses at least one Weigand wire to sense the proximity of the magnetic pole. The Weigand wire is externally sensitized to respond to a magnet approaching in a particular direction. Magnets are used to pre-sensitize the Weigand wire in the preferred direction. Furthermore, the Weigand wire and adjacent coil of the Meister device is mounted in a recess provided in the external wall of the housing. Such a configuration requires that the housing be machined or configured to accept the Weigand wire. Such machining is costly and time consuming.

U.S. Pat. No. 3,768,832 discloses a crash restraint device which includes an inertial switch which generates a current used to activate a gas generating device to provide gas for inflation of an air bag. The current generating device includes a housing enclosing an inertial slug (magnet) having opposite poles at its front end and rear end. An induction coil is located forwardly and is provided with a central opening in which the magnet is slidably positioned. Movement of the magnet through the coil generates an electrical signal to actuate an air bag system.

The device of U.S. Pat. No. 3,768,832 uses a single magnet which is rigidly secured (by a breakable support member) to the frame of an automobile or the like and is movable in the induction coil only in response to an impact force breaking the support member to permit the magnet to slide between the windings of the coil and thus generate an electric output signal. The sensor cannot automatically re-set itself and is not non-destructibly testable.

The sensor of the present invention is an automatically re-setting sensor which comprises a non-ferrous housing having a passage therein and end members sealing the passage at the ends thereof. At least one pair of magnetic members is mounted in the passage and each pair of magnetic members are provided with opposite ends of opposite polarity. The magnetic members are mounted in the passage so that one member is rigidly affixed in the housing and the other magnetic member is slidably disposed in the passage in predetermined spaced relation with the affixed magnetic member. The magnetic members are positioned in the passage with the ends facing each other being of like polarity. The predetermined spaced relation between the magnetic members is maintained solely by the repelling force between the magnetic members. An induction coil is mounted in circumferential relation around the external surface of the housing at a position which is intermediate the slidable magnetic member and the fixed magnetic member. A voltage is generated in the induction coil as a result of the movable magnet moving through the coil and this voltage is disposed for transmission to a device disposed for actuation responsive to an impact force acting on the sensor assembly.

In another embodiment of the present invention, a second magnetic member is rigidly secured in the housing in spaced relation with the first affixed magnetic member with the slidably disposed magnet being positioned in predetermined spaced relation between the affixed magnetic members. A second inductance coil is wound around the external surface of the housing at a position between the second affixed magnetic member and the slidable magnetic member.

It is an object of the present invention, therefore, to provide an impact responsive sensor having no electrical power source.

It is a further object of the present invention to provide such an impact responsive sensor which generates an electrical output signal only in response to impact forces acting on the sensor.

It is yet a further object of the present invention to provide such a sensor which automatically resets itself after being actuated by an impact force.

These and other objects of the present invention will be more readily apparent from the following detailed description, accompanying drawings and appended claims.

BRIEF DESCRIPTION OF THE DRAWINGS

FIG. 4 is diagrammatic illustration of a system which utilizes the sensor of the present invention to electrically actuate a desired component which must be actuated in response to impact forces acting thereon.

FIG. 5 is a view similar to FIG. 4 but which illustrates the actuated component as an automobile air bag.

FIG. 6 is a view similar to FIGS. 1 and 2 and illustrates the sensor assembly as having damping means and a shield housing to protect against non-desirable electromagnetic radiation such as RF energy or external magnetic fields.

DESCRIPTION OF THE PREFERRED EMBODIMENT

Figure 1:
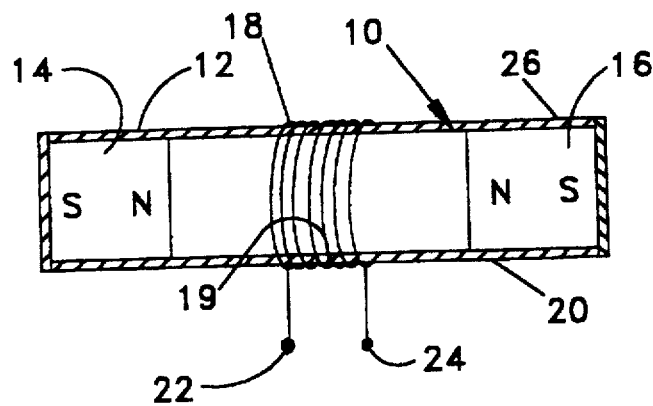
FIG. 1 is a longitudinal sectional view of the impact responsive sensor of the present invention.

As seen in FIG. 1, an impact sensor 10 includes a non-ferrous body or housing 12 enclosing a pair of permanent magnets 14 and 16 mounted in spaced relation therein with the surfaces of the magnets facing each other being of like polarity to set up a predetermined repelling force between the magnets and thus keep the magnets in predetermined spaced relation. The housing is shown to have a smooth outer surface having no recesses or indentions to receive any unnecessary externally mounted components. The housing 14 may be comprised of plastic material.

Only an induction coil is provided on the outer surface of the housing and this induction coil 18 is wound around the outer surface 20 of housing 12 and includes terminals or ends 22 and 24 which are adapted for connection to a component to be electrically actuated. Magnet 14 is shown to be loosely and slidably mounted in the housing and magnet 16 and being rigidly permanently affixed in one end 26 of the housing (as by gluing, etc.). Coil 18 is disposed around the housing and at a position which is intermediate the two magnets 14 and 16.

In operation, in response to the sensor being abruptly stopped, (by impact, for example), the movable magnet 14 is displaced in a direction which is toward the affixed magnet 16. It is only necessary that the impact force be sufficient for the magnet 14 to be displaced (slid) through the coil winding 18. This movement of the movable magnet through the induction winding generates an output voltage at terminals 22 and 24. These terminals may connect to an amplifier 26 (FIG. 4) and to an actuator 28 (such as an explosive actuator, a solenoid valve, etc.) which serves to activate a component or mechanism 30 to perform a function which is desired to be performed in response to an impact force.

FIG. 5 is a block diagram similar to FIG. 4 but specifically illustrates the actuator 30 of FIG. 4 as being an explosive device 32 connected to an air source 33 which is connected to an air bag 34 of the type used in present day vehicles and which must be actuated in response to an impact force. Such explosive actuated air bag actuation devices are disclosed in U.S. Pat. No. 3,768,832.

Figure 2:
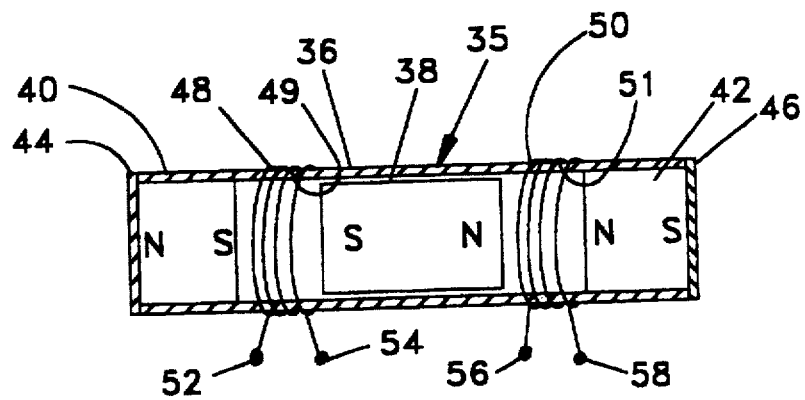
FIG. 2 is a longitudinal sectional view of an alternate embodiment of the impact sensor of the present invention.

FIG. 2 is a longitudinal sectional view of a sensor 35 similar to FIG. 1 for performing similar functions as discussed in conjunction with the sensor of FIG. 1. However, this sensor is bidirectional and includes a housing 36 (non-ferrous) which encloses a slidable substantially elongated magnet 38 which is disposed intermediate a pair of spaced magnets 40 and 42 which are rigidly secured at opposite ends 44 and 46 of the housing in proper orientation as discussed above. A pair of induction coils 48 and 50 are wound in spaced relation around the housing 36. Coil 48 is wound around the housing at a position which is between fixed magnet 40 and slidable magnet 38. Coil 50 is wound around the housing 36 at a position which is between slidable magnet 38 and fixed magnet 42. Coil 48 is provided with terminals 52 and 54 and coil 50 is provided with terminals 56 and 58 for actuation of various components as discussed supra.

Operation of the sensor of this embodiment is similar to that discussed in conjunction with the embodiment of FIG. 2 except this sensor is responsive to impact forces coming from opposite directions.

Figure 3:
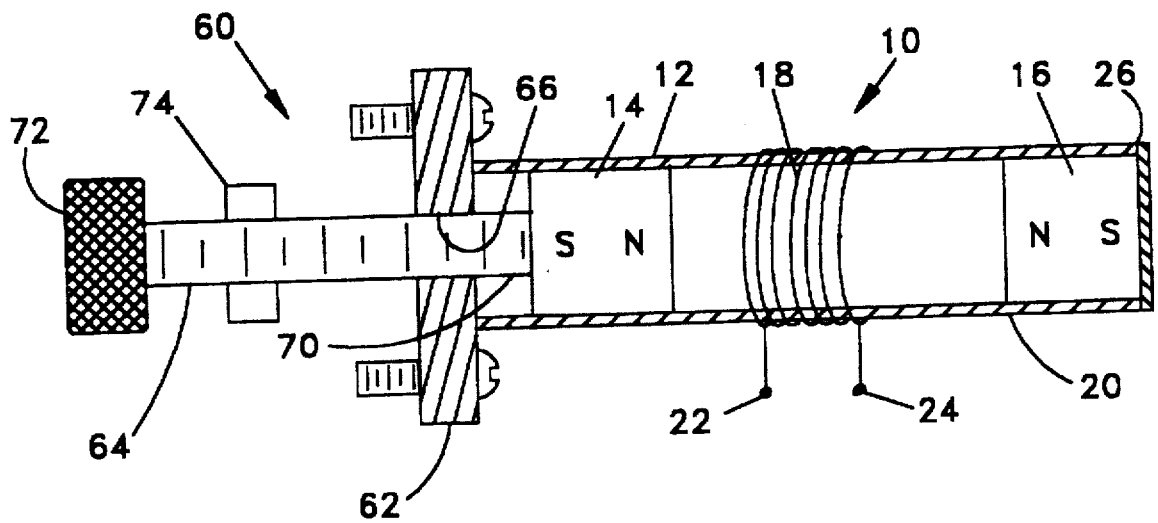
FIG. 3 is a longitudinal sectional view of the impact sensor of FIG. 1 having a fixture mounted thereto for calibrating the sensor by providing a predetermined spacing between the magnets sensing for a predetermined impact force.

FIG. 3 illustrates a fixture 60 for determining the positions of the magnets are spaced apart for a given impact force and the necessary repelling force may be determined by adjusting the movable magnet relative to the fixed magnet. Once the proper distance (and, therefore the proper repelling force for given magnets is determined) the length of the housing may be determined for the magnets to be mounted therein.

To provide this function, fixture 60 includes a support plate or bracket 62 which is secured to the housing at the end away from affixed magnet. The fixture includes a threaded member 64 extending through a threaded opening 66 in bracket 62. The unaffixed movable magnet is supported on one end 70 of member 64 and a knob 72 is provided at the other end of member 64. A lock nut 74 is threadably mounted on member 64 between knob 72 and bracket 62. The movable magnet is placed in the housing and supported therein by the threaded member 64 which is rotated in bracket 62 and locked in position by the lock nut.

In FIG. 6, wherein like numerals refer to like parts, the sensor assembly of FIG. 1 is shown enclosed in a shield housing 76. The housing 76 is shown to be provided with a flanged end portion 78 secured to a support member 80 which is disposed for secured relation with the vehicle. The housing 76 is comprised of a permeable material to prevent stray electromagnetic energy (i.e., RF energy or magnetic fields) from entering the housing 12 in which the magnets are mounted. FIG. 6 also illustrates the housing 76 as being provided with a pair of terminals 82 and 84 having the electrical leads or terminals of the coil secured thereto. External leads 86 and 88 are shown leading from the terminals 82 and 84 and are connectable to an air bag actuator or other component to be energized. The terminals 82 and 84 are insulated from the housing and the leads 86 and 88 are also shielded. Such shielding may be utilized in all embodiments of the invention. However, it is to be understood that to provided proper shielding the permeable material of the shield housing must be sufficiently spaced from the non-ferrous internal housing so as not to interfere with the operation of the sensor.

If damping of the sensors is desired, it is within the inventive concept of the present invention to provide such damping by air, gas or liquid sealed within the housing. One such liquid may be in the form of an anti-freeze solution 77 or the like (FIG. 6) carried in the passage in which the slidable magnetic member is mounted.

It is to be understood that while the impact sensor of the present invention has been described as used as an actuator for automobile air bags, it is to be understood that the sensors may be used for other purposes. One such use, for example, would be as a deterrent against "car-jacking" wherein a vehicle is used to impact with another vehicle in order to force the driver of the impacted vehicle to stop the vehicle. In such an instance the sensor mounted on the impacted vehicle would trigger a mechanism such as a solenoid valve, etc. to close a valve between the carburetor or fuel injector system and the gas tank to prevent fuel flow from the gas tank to the automobile engine thereby shutting down fuel flow from the main gas tank to the engine. A second smaller tank containing a predetermined amount of gas (perhaps ½-pint) would be connected to the engine and direct this smaller amount of gas to the automobile engine so that the automobile may move some distance from the impact scene until it stopped. Alternatively, the electrical output from the sensor could be directed through a delay circuit to trigger a disablement device which would disable the ignition system to shut-down the system after a period of time.

The sensor of the present invention provides many novel features and advantages over the prior art, among those are simplicity of design, ease of manufacture, low cost to the end user, absolute reliability, superiority over all previously designed devices for a given use, extended usable lifetime, indestructible structure in normal use, and, adaptability to different systems.

While the preferred embodiments of the invention have been disclosed, it should be readily appreciated that the invention is susceptible of modification without departing from the spirit of the invention or the scope of the subjoined claims.

I claim:

1. An impact sensor comprising:

a non-ferrous housing having a passage therein and an end member provided at each end of said housing for enclosing said passage at opposite ends thereof;

a first magnetic member mounted in and being rigidly secured in said housing, a second magnetic member being slidably positioned in said passage for movement in an axial path, each of said first and second magnetic members having opposite magnetic poles and being positioned in said passage with a pair of poles of like polarity facing each other and with only the repelling magnetic force between said poles of like polarity serving to maintain said spaced relation between said first and second magnetic members;

voltage generating and pick off means comprising a single inductance coil winding circumferentially wound about said housing, said inductance coil winding having a bore and being positioned intermediate said first and second magnetic members and so disposed relative to the path of said second magnetic member so that an impulse voltage is induced in said single winding by movement of said second magnetic member in said axial path responsive to an impact force acting on said housing, said impact force being of a magnitude which causes said second magnetic member to overcome the repelling magnetic force between said first and second magnetic members so that said second magnetic member will move into said bore of said winding and thereby generate said impulse voltage;

conducting means extending from said inductance coil winding to transmit said voltage from said inductance coil winding; and an automotive vehicle for supporting said sensor, said vehicle being provided with an air bag and means for actuating said air bag for inflation thereof, said conducting means extending from said inductance coil winding being electrically connected to said actuation means for activation thereof responsive to said impact force acting on said vehicle.

* * * * *